(12) United States Patent
Naiki et al.

(10) Patent No.: US 12,476,518 B2
(45) Date of Patent: Nov. 18, 2025

(54) MOTOR UNIT FOR MOTOR INCORPORATING ROLLER, GEARED MOTOR, AND METHOD FOR MANUFACTURING THE SAME

(71) Applicant: ITOH DENKI CO., LTD., Kasai (JP)

(72) Inventors: Hideo Naiki, Kasai (JP); Makoto Mitsuyoshi, Kasai (JP)

(73) Assignee: Itoh Denki Co., Ltd., Kasai (JP)

( * ) Notice: Subject to any disclaimer, the term of this patent is extended or adjusted under 35 U.S.C. 154(b) by 246 days.

(21) Appl. No.: 17/974,833

(22) Filed: Oct. 27, 2022

(65) Prior Publication Data

US 2023/0139580 A1    May 4, 2023

(30) Foreign Application Priority Data

Oct. 29, 2021  (JP) ................................ 2021-177434
Jan. 25, 2022  (JP) ................................ 2022-009503

(51) Int. Cl.
*H02K 7/116*  (2006.01)
*H02K 7/102*  (2006.01)
*H02K 15/00* (2006.01)

(52) U.S. Cl.
CPC ............. *H02K 7/116* (2013.01); *H02K 7/102* (2013.01); *H02K 15/00* (2013.01)

(58) Field of Classification Search
CPC ...... H02K 7/116; H02K 7/112; H02K 7/1125; H02K 7/102; H02K 7/1021; H02K 7/1023; H02K 15/00; B65G 23/08; E06B 9/72
USPC ..................................................... 310/76, 77
See application file for complete search history.

(56) References Cited

U.S. PATENT DOCUMENTS

| | | | |
|---|---|---|---|
| 6,456,032 B2 | 9/2002 | Itoh et al. | |
| 2001/0002099 A1* | 5/2001 | Itoh | B65G 13/075 |
| | | | 318/727 |
| 2004/0239196 A1* | 12/2004 | Miura | H02P 3/04 |
| | | | 318/372 |
| 2017/0271947 A1* | 9/2017 | Ando | H02K 11/215 |

FOREIGN PATENT DOCUMENTS

| | | |
|---|---|---|
| DE | 10 2006 041689 A1 | 3/2008 |
| DE | 20 2018 105651 U1 | 11/2018 |
| EP | 1 345 307 A2 | 9/2003 |
| FR | 2 872 196 A1 | 12/2005 |
| JP | 2020103036 A | 7/2020 |

OTHER PUBLICATIONS

European Search Report issued Mar. 13, 2023 in European Patent Application No. EP 22 20 2429.

* cited by examiner

*Primary Examiner* — Michael Andrews
(74) *Attorney, Agent, or Firm* — Wood, Phillips, Katz, Clark & Mortimer

(57) ABSTRACT

A motor unit configured to be inserted into a separately prepared roller body to constitute a motor incorporating roller, comprising an outer cylinder, a motor, a brake member, and a circuit board, wherein the outer cylinder incorporates the motor, the brake member, and the circuit board, wherein the brake member is located between the motor and the circuit board in the outer cylinder, and wherein the circuit board is wired to the motor and the brake member in the outer cylinder.

9 Claims, 9 Drawing Sheets

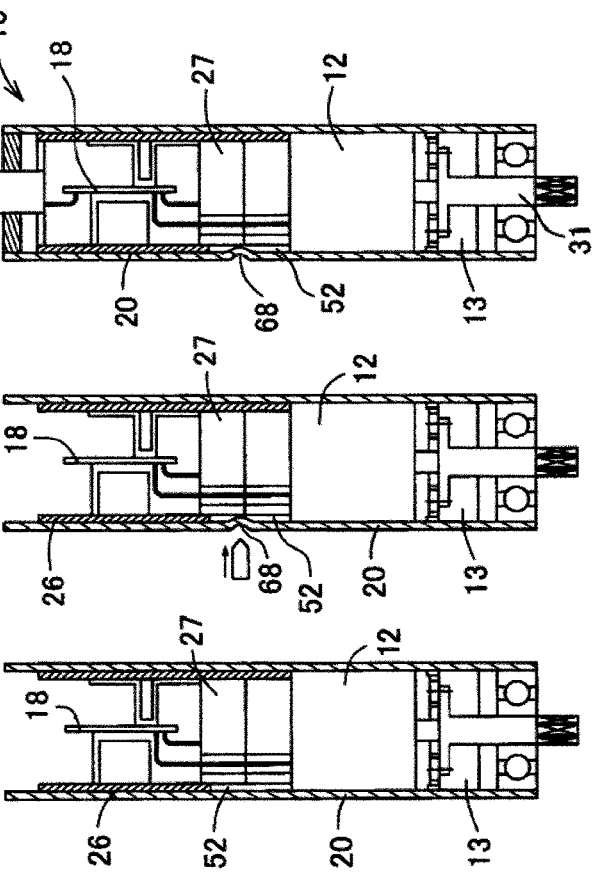
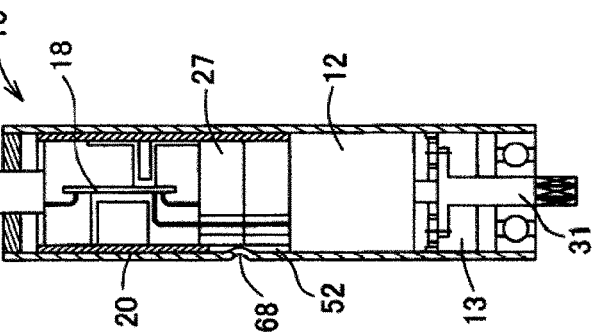
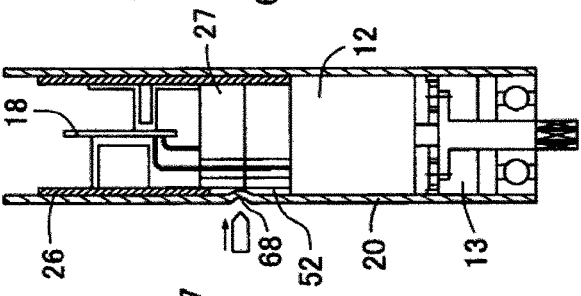
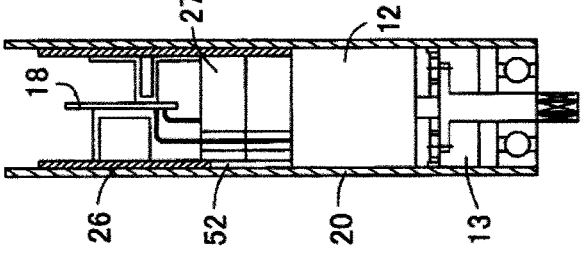
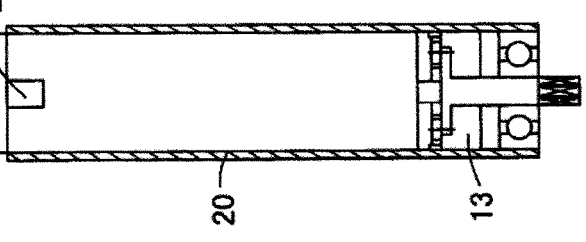
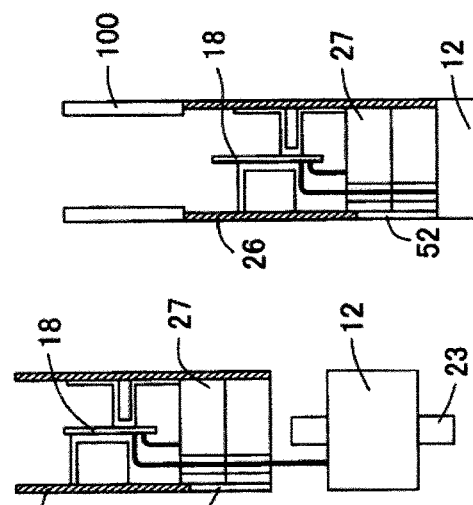
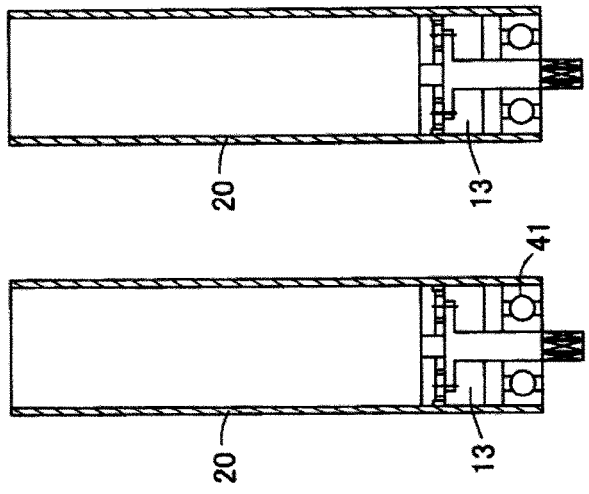
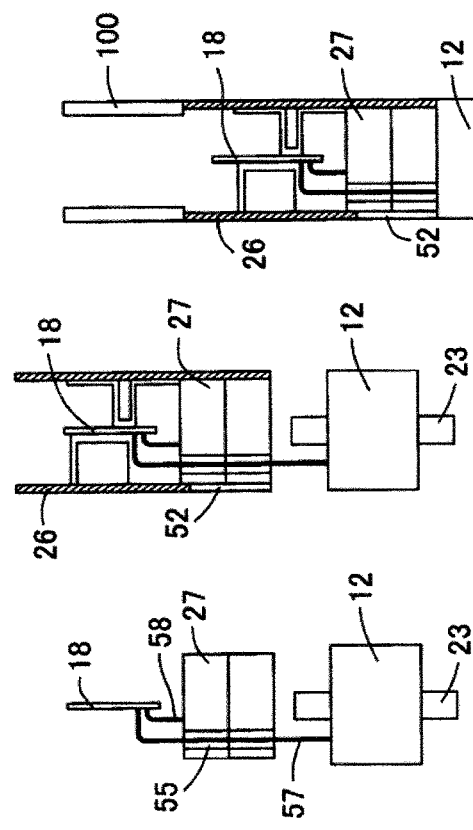
FIG. 7A  FIG. 7B  FIG. 7C  FIG. 7D  FIG. 7E  FIG. 7F

MOTOR UNIT FOR MOTOR INCORPORATING ROLLER, GEARED MOTOR, AND METHOD FOR MANUFACTURING THE SAME

BACKGROUND OF THE INVENTION

Field of the Invention

The present invention relates to a motor unit for a motor incorporating roller that drives a roller body of a motor incorporating roller. The present invention also relates to a method for manufacturing the motor unit for the motor incorporating roller. The present invention further relates to the motor incorporating roller. The present invention further relates to a geared motor and a method for manufacturing the geared motor.

Background Art

As a component of a roller conveyor device or the like, a motor incorporating roller is known. The motor incorporating roller has a motor and a speed reducer incorporated in the roller body, and rotates the outer roller body by driving an incorporated motor. Some motor incorporating rollers do not have the speed reducer.

Some motor incorporating rollers incorporate a drive unit such as a motor into a separately prepared cylinder body. Hereinafter, the motor unit for the motor incorporating roller will be simply referred to as a motor unit. The motor unit is applicable to roller bodies having different lengths, and accordingly has high versatility as a component. Furthermore, the motor incorporating roller can be easily assembled by adopting the motor unit. Patent Document 1 discloses a motor unit with a built-in circuit board. The motor unit has a structure similar to that of the geared motor.
Patent Document 1: JP 2020-103036 A A brake-equipped conveyor device is well known. In the brake-equipped conveyor device, in most cases, the brake is externally attached to the motor incorporating roller. Although the brake is disposed in the roller body of the motor incorporating roller in some cases, the motor incorporating roller having this structure usually does not use the motor unit. A brake-equipped motor incorporating roller is difficult to assemble since it is difficult to utilize the motor unit.

The present invention has been made for solving the above-described problem, and an object thereof is to provide a motor unit for a motor incorporating roller having a brake function. Another object of the present invention is to provide a geared motor having a brake function.

SUMMARY OF THE INVENTION

As an aspect for solving the above problem is a motor unit configured to be inserted into a separately prepared roller body to constitute a motor incorporating roller, including an outer cylinder, a motor, a brake member, and a circuit board, wherein the outer cylinder incorporates the motor, the brake member, and the circuit board, wherein the brake member is located between the motor and the circuit board in the outer cylinder, and wherein the circuit board is wired to the motor and the brake member in the outer cylinder.

In the motor unit of the present aspect, the motor, the brake member, and the circuit board are incorporated in the outer cylinder. In the motor unit of the present aspect, the brake member is also included in the unit in addition to the drive unit such as the motor and the like, and the circuit board. Therefore, it is easy to use for manufacturing a brake-equipped motor incorporating roller, and assembly thereof is simplified. In the motor unit of the present aspect, the brake member is located between the motor and the circuit board. Therefore, it is easy to configure a power transmission mechanism from the motor to the outside.

In the above aspect, it is preferable that the motor includes a rotor and a stator that covers periphery of the rotor, the stator being fixed to the outer cylinder, and the motor unit includes an inner cylinder inserted into the outer cylinder, the inner cylinder covering the brake member and the circuit board.

In the above aspect, it is preferable that the motor includes a rotor and a stator that covers periphery of the rotor, the stator being fixed to the outer cylinder, and the motor unit includes a pressing member inserted into the outer cylinder, the pressing member covering the brake member and the circuit board.

In the case of adopting a configuration in which the motor, the brake member, and the circuit board are provided in the outer cylinder, it is necessary to electrically connect the circuit board to the stator of the motor and the brake member. However, when the motor, the brake member, and the circuit board are incorporated in the outer cylinder, it is difficult in terms of space to connect them. Therefore, they are inserted into the outer cylinder after being connected outside. Here, the roller body of the motor incorporating roller is rotated by the motor in the motor unit. On the other hand, the outer cylinder of the motor unit is fixed to the outside and does not rotate. The motor includes the rotor and the stator. The rotor rotates, but the stator is not allowed to rotate. Therefore, in the motor unit, the stator needs to be non-rotatably attached to the outer cylinder. Therefore, in many cases, the stator of the motor is press-fitted into the outer cylinder. However, it is difficult to press-fit the stator in a state where the motor and the brake member are connected to the circuit board. That is, the stator has rigidity enough to withstand the pressing force of press-fitting, but the brake member and the circuit board do not have such rigidity. Therefore, it is difficult to press-fit the stator by pressing the circuit board.

The present aspect solves this problem. The motor unit of the present aspect includes the inner cylinder or the pressing member, and the brake member and the circuit board are covered with the inner cylinder or the pressing member. With the motor unit of the present aspect, the stator can be press-fitted into the roller body by applying the external force to the inner cylinder or the pressing member to press the stator via the inner cylinder.

In the above aspect, it is preferable that the inner cylinder is directly or indirectly in contact with a part of the motor, and the motor moves integrally with the inner cylinder when the inner cylinder is pressed in an axial direction.

In the above aspect, it is preferable that the pressing member is directly or indirectly in contact with a part of the motor, and the motor moves integrally with the pressing member when the pressing member is pressed in an axial direction.

According to the present aspect, it is easy to press-fit the stator into the roller body by pressing the stator via the inner cylinder or the pressing member.

In the above aspect, it is desirable that the inner cylinder has an opening or a notch, and at the opening or the notch, the brake member is engaged with the outer cylinder directly or via another member interposed between the brake member and the outer cylinder.

In the above aspect, it is desirable that the pressing member has an opening or a notch, and at the opening or the notch, the brake member is engaged with the outer cylinder directly or via another member interposed between the brake member and the outer cylinder.

Since the brake member needs to obtain the reaction force against rotation, a fixed and non-rotating portion is required. As described above, since the outer cylinder is fixed to the outside and does not rotate, it is desirable to engage a part of the brake member with the outer cylinder. In the motor unit of the present aspect, the inner cylinder and the pressing member have the opening or the notch, and the brake member and the outer cylinder are engaged with each other directly or with another member interposed therebetween at the opening or the notch. Therefore, the brake member can obtain the reaction force against rotation.

In the above aspect, it is desirable that the brake member includes a groove on its side surface, the groove accommodating wiring that connects the motor to the circuit board.

According to the present aspect, the wiring is hardly damaged when the device is inserted into the inner cylinder.

An aspect of a motor incorporating roller is a motor incorporating roller including the motor unit according to any one of the above wherein the motor unit is inserted into a roller body.

The motor incorporating roller of the present aspect has high compatibility of components and is easy to assemble.

An aspect is a method for manufacturing a motor unit, wherein the motor unit is configured to be inserted into a separately prepared roller body to constitute a motor incorporating roller, wherein the motor unit includes an outer cylinder, a motor, a brake member, a circuit board, and an inner cylinder, the outer cylinder incorporating the motor, the brake member, and the circuit board, the method including the steps of: wiring the circuit board to the motor and the brake member outside the outer cylinder; inserting the circuit board and the brake member into the inner cylinder, and press-fitting the motor into the outer cylinder by pressing the inner cylinder in a state where a part of the inner cylinder is in contact with a part of the motor.

Another aspect is a method for manufacturing a motor unit, wherein the motor unit is configured to be inserted into a separately prepared roller body to constitute a motor incorporating roller, wherein the motor unit includes an outer cylinder, a motor, a brake member, a circuit board, and a pressing member, the outer cylinder incorporating the motor, the brake member, and the circuit board, the method including the steps of: wiring the circuit board to the motor and the brake member outside the outer cylinder; surrounding the circuit board and the brake member with the pressing member, and press-fitting the motor into the outer cylinder by pressing the pressing member in a state where a part of the pressing member is in contact with a part of the motor.

Another aspect for solving the above problem is a geared motor including: an outer cylinder, a motor, a speed reducer, a brake member, and a circuit board, wherein the outer cylinder incorporates the motor, the speed reducer, the brake member, and the circuit board, wherein the brake member is located between the motor and the circuit board in the outer cylinder, wherein the circuit board is wired to the motor and the brake member in the outer cylinder, wherein the motor includes a rotor and a stator that covers periphery of the rotor, the stator being fixed to the outer cylinder, wherein the geared motor includes a pressing member inserted into the outer cylinder, the pressing member covering the brake member and the circuit board, wherein the pressing member is directly or indirectly in contact with a part of the motor, and wherein the motor moves integrally with the pressing member when the pressing member is pressed in an axial direction.

Another aspect for solving the above problem is a method for manufacturing a geared motor, the geared motor including: an outer cylinder; a motor; a speed reducer; a brake member; and a circuit board, the outer cylinder incorporating the motor, the speed reducer, the brake member, the circuit board, and a pressing member, the method including the steps of: connecting the circuit board to the motor and the brake member outside the outer cylinder; surrounding the circuit board and the brake member with the pressing member, and press-fitting the motor into the outer cylinder by pressing the pressing member in a state where a part of the pressing member is in contact with a part of the motor.

A motor unit for a motor incorporating roller of the present invention includes a brake member, and has high compatibility of components in manufacturing a motor incorporating roller having a brake function.

A geared motor of the present invention includes a brake member and is widely used.

BRIEF DESCRIPTION OF THE DRAWINGS

FIGS. 7A to 7F are explanatory views illustrating a manufacturing process of the motor unit for the motor incorporating roller (geared motor) in FIG. 4.

DETAILED DESCRIPTION OF THE PREFERRED EMBODIMENTS

Hereinafter, embodiments of the present invention will be described.

Figure 1:
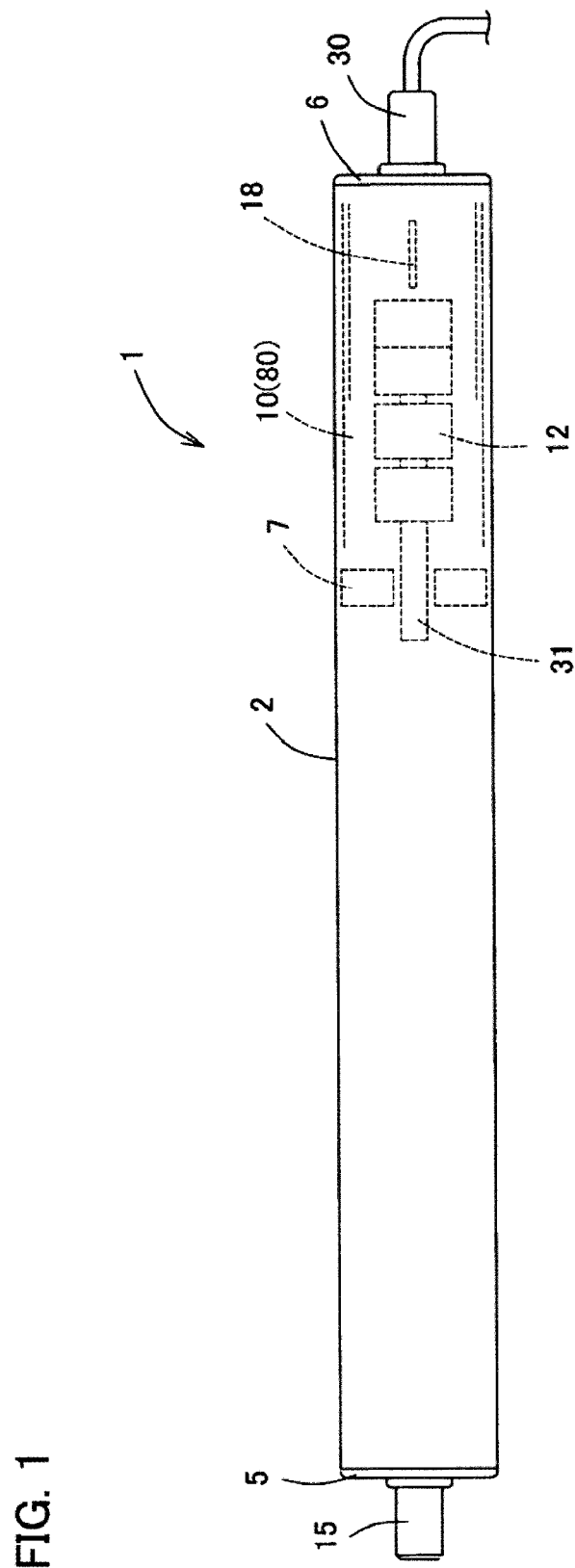
FIG. 1 is a front view of a motor incorporating roller according to an embodiment of the present invention.
Figure 2:
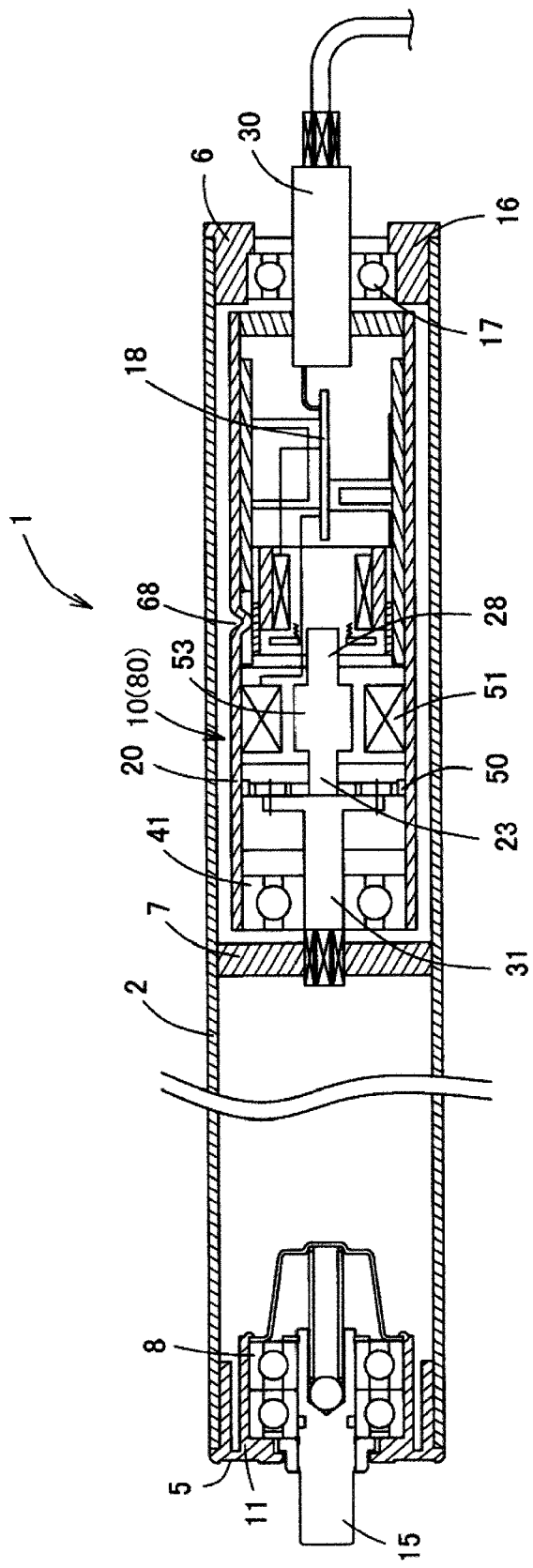
FIG. 2 is a cross-sectional view of the motor incorporating roller in FIG. 1.
Figure 3:
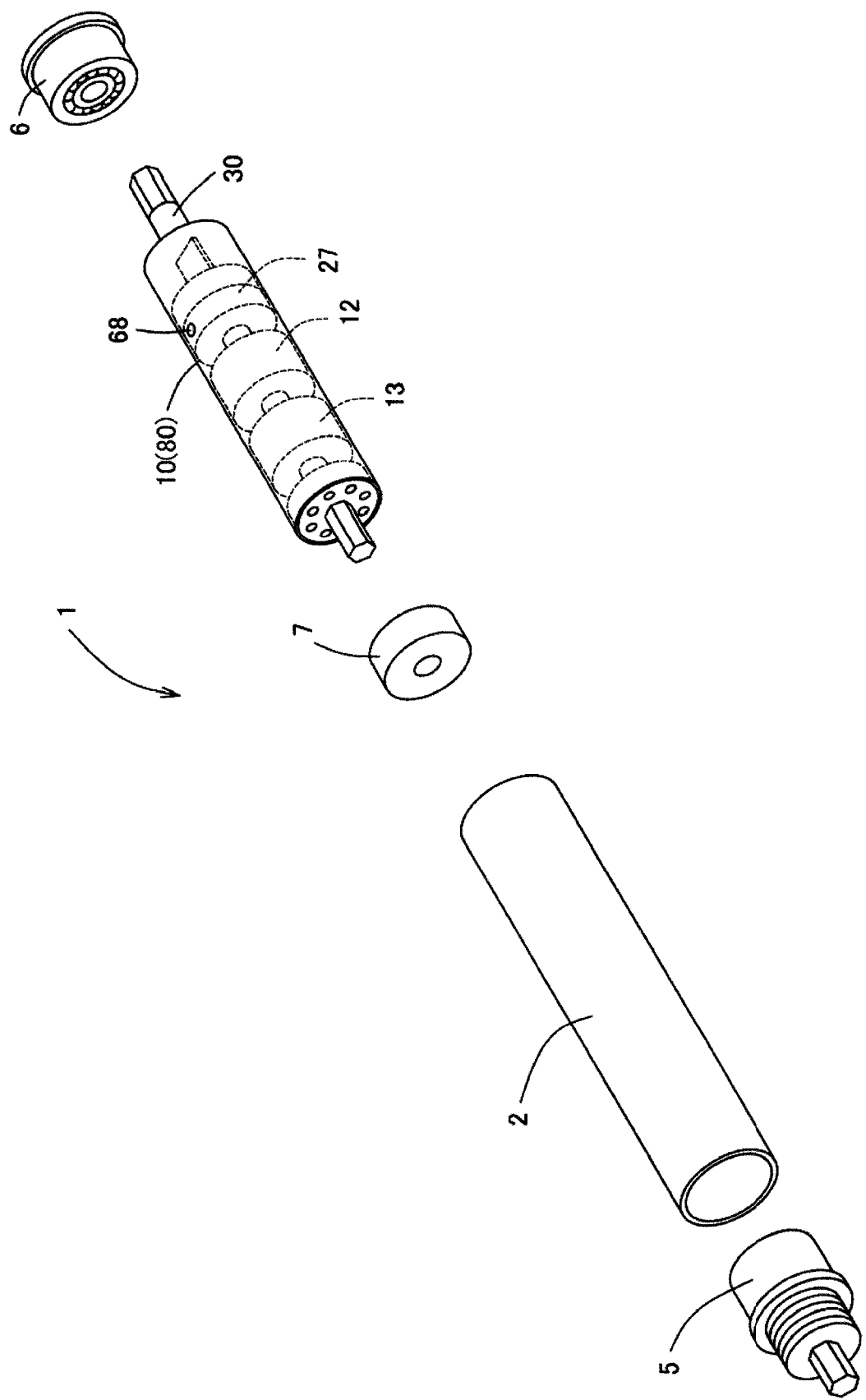
FIG. 3 is an exploded perspective view of the motor incorporating roller in FIG. 1.

First, the structure of a motor incorporating roller 1 will be schematically described. As illustrated in FIGS. 1 and 2, the motor incorporating roller 1 includes a cylindrical hollow roller body 2 and lid members 5 and 6, and a power transmission member 7 and a motor unit (motor unit for a motor incorporating roller) 10 are incorporated inside.

The roller body 2 is a cylinder opened at both ends. The lid members 5 and 6 are attached so as to close both ends of the roller body 2. As illustrated in FIG. 2, the one lid member 5 (the left side in FIG. 2) is formed by integrating a cylindrical roller body fitting member 11, a bearing 8, and a body-side shaft member 15. In the other lid member 6 (right side in FIG. 2), a roller body fitting member 16 and a bearing 17 are integrated.

Figures 4A, 4B:
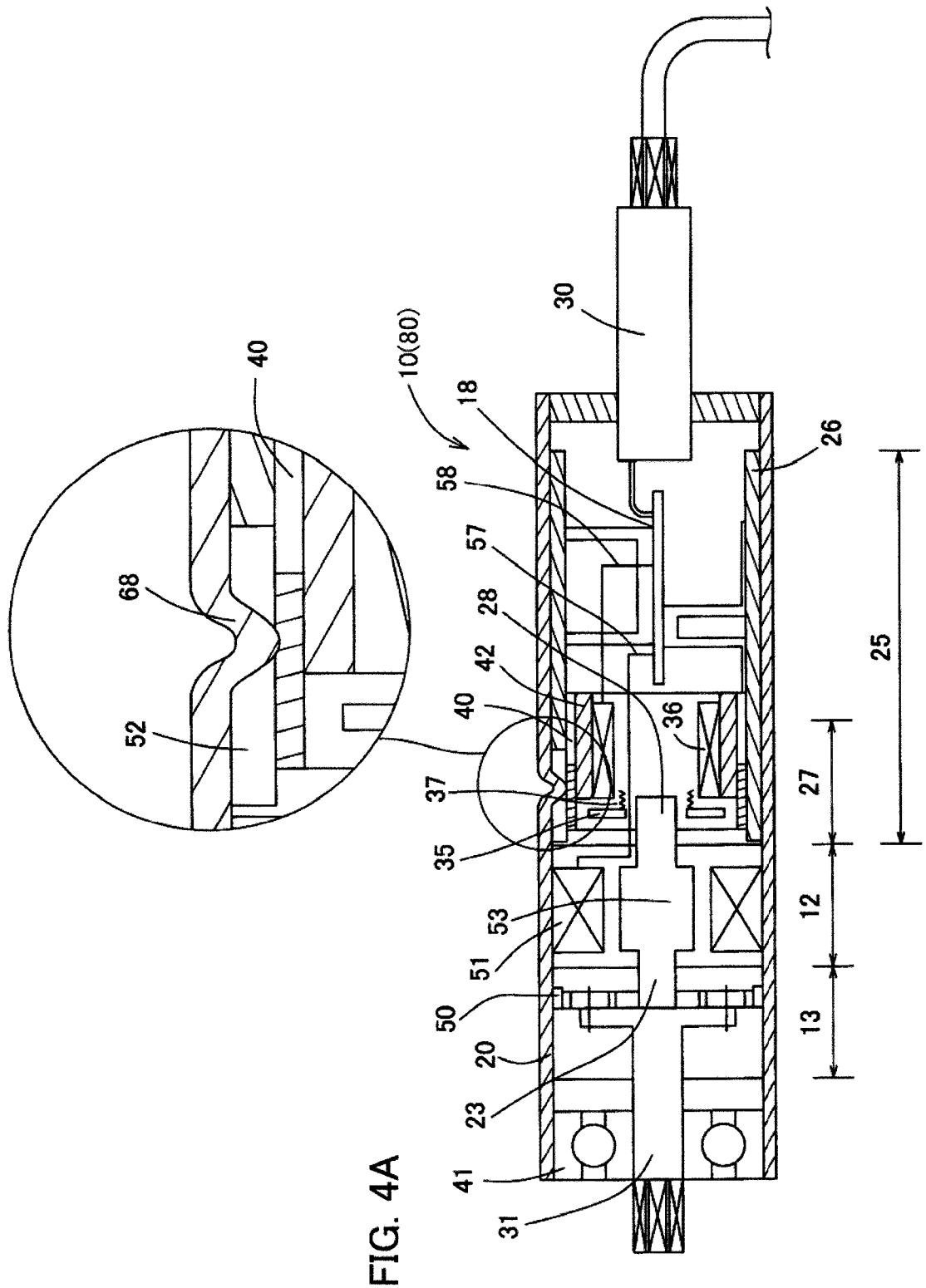
FIG. 4A is a cross-sectional view of a motor unit for a motor incorporating roller (geared motor) incorporated in the motor incorporating roller in FIG. 1.
FIG. 4B is an enlarged view of the circle in FIG. 4A.
Figure 5:
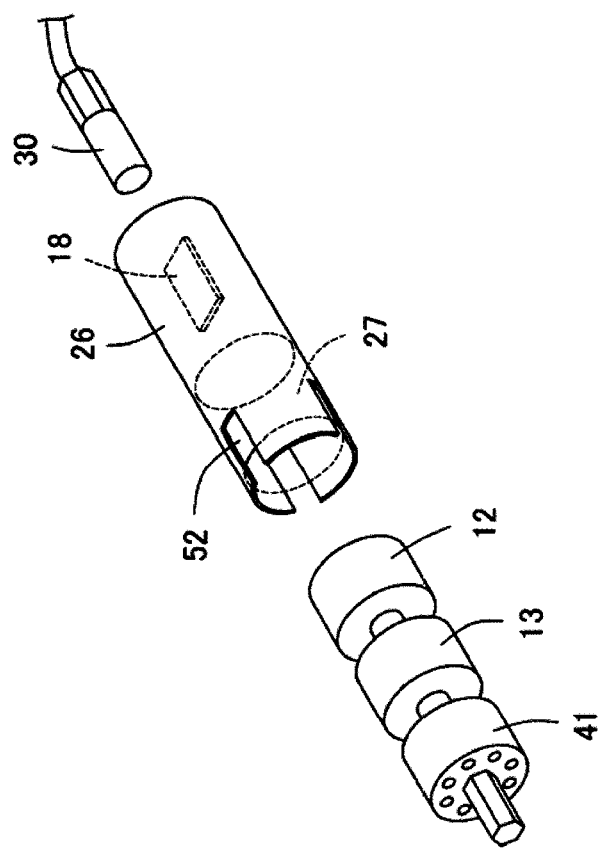
FIG. 5 is an exploded perspective view of the motor unit for the motor incorporating roller (geared motor) in FIG. 4.
Figure 5:
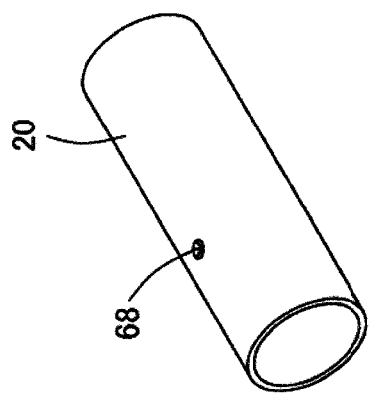

As illustrated in FIGS. 4 and 5, the motor unit 10 (motor unit for the motor incorporating roller) includes a cylindrical outer cylinder 20, and a motor 12, a speed reducer 13, and an inner cylindrical portion 25 are incorporated in the outer cylinder 20. In the inner cylindrical portion 25, a brake member 27 and a circuit board 18 are incorporated in an inner cylinder (pressing member) 26.

The motor 12 includes a rotor 53 and a stator 51. The rotor 53 is located at the center, and the stator 51 covers the periphery thereof. The motor 12 is a Hall sensorless motor. The Hall sensorless motor is also referred to as a DC Hall less motor or a brushless Hall less motor, and is a motor that performs rotor position detection without using a Hall sensor. In the Hall sensorless motor, a rotation of the rotor is controlled without detecting a rotational position (angle) of the rotor. The speed reducer 13 has a planetary gear train. An output shaft of the speed reducer 13 is a drive-side shaft 31.

The brake member 27 is an electromagnetic brake. The brake member 27 includes a main body 42 and a brake holder 40. The main body 42 accommodates a brake disc (not illustrated) attached to a rotation shaft 28 of the motor 12, a brake pad 35, a brake electromagnet 36, and a pressing spring 37. The brake pad 35 is always pressed against the brake disc by the pressing spring 37. The brake electromagnet 36 is in the vicinity of the brake pad 35, attracts the brake pad 35 by energization, and separates the brake pad 35 from the brake disc. As described above, the brake member 27 always unrotatably fixes the rotation shaft 28 of the motor, and opens the rotation shaft 28 by energizing the brake electromagnet 36. The brake holder 40 is a member that covers the outside of the main body 42, and is integrally fixed to the main body 42 in the rotation direction.

The circuit board 18 is for controlling the operations of the motor 12 and the brake member 27, and includes an input circuit, a microcomputer unit, a motor drive circuit, and a brake control circuit (all not illustrated). In addition, a communication function for communicating with the outside is provided.

The outer cylinder 20 is provided with a fixed-side shaft 30 protruding outward from one axial end and the drive-side shaft 31 protruding outward from the other axial end. The fixed-side shaft 30 is integrally attached to the outer cylinder 20 and does not rotate relative to each other.

The fixed-side shaft 30 is a shaft that is inserted into the bearing 17 of the other lid member 6 in a state where the motor unit 10 is disposed in the roller body 2, and is a portion that functions as one body-side shaft member of the roller body 2. The fixed-side shaft 30 is hollow and has a signal line and a power line inserted therein. These lines are connected to the circuit board 18. The drive-side shaft 31 (output shaft of the speed reducer 13) is a shaft connected to the power transmission member 7 in a state where the motor unit 10 is disposed in the roller body 2, and is a rotation shaft that outputs the power of the motor 12 to the roller body 2. The drive-side shaft 31 is rotatably supported by the outer cylinder 20 via a bearing 41.

The motor 12, the speed reducer 13, the brake member 27, and the circuit board 18 are incorporated in the roller body 2 of the motor incorporating roller 1. In the motor incorporating roller 1, the body-side shaft member 15 protrudes from one end. The fixed-side shaft 30 of the motor unit 10 protrudes from the other end of the motor incorporating roller 1. The motor incorporating roller 1 is supported by the body-side shaft member 15 and the fixed-side shaft 30 of the motor unit 10 that are protruding from both ends and are fixed to a conveyor frame (not illustrated). The roller body 2 is provided with the bearing 8 between the roller body 2 and the body-side shaft member 15, and the bearing 17 between the roller body 2 and the fixed-side shaft 30 of the motor unit 10, so that the roller body 2 can rotate relative to the conveyor frame (not illustrated). On the other hand, since the fixed-side shaft 30 is fixed to the conveyor frame and the fixed-side shaft 30 is integrally attached to the outer cylinder 20, the motor unit 10 is not rotatable relative to the conveyor frame.

The motor incorporating roller 1 is supplied with power from the outside via a wiring inserted through the fixed-side shaft 30. The motor 12 is supplied with power from the circuit board 18. When the motor 12 rotates in the motor unit 10, the rotational force is decelerated by the speed reducer 13 and output from the drive-side shaft 31. The drive-side shaft 31 is engaged with the power transmission member 7, and the rotational force is transmitted to the roller body 2 via the power transmission member 7. The roller body 2 is forcibly stopped by driving the brake member 27.

Next, a characteristic configuration of the motor incorporating roller 1 will be described.

In the motor incorporating roller 1 of the present embodiment, not only the motor 12 and the speed reducer 13 but also the brake member 27 and the circuit board 18 are incorporated in the roller body 2. The motor 12 adopted in the present embodiment includes the rotor 53 at the center, and the stator 51 surrounds the rotor 53. In the motor 12 adopted in the present embodiment, rotation shafts 23 and 28 protrude from both ends, one rotation shaft 23 is connected to the speed reducer 13, and the other rotation shaft 28 is connected to the brake member 27.

Therefore, in the layout of the outer cylinder 20 of the motor unit 10, the speed reducer 13, the brake member 27, and the circuit board 18 are arranged in this order from the drive-side shaft 31 side. In the present embodiment, the speed reducer 13 can be disposed in front of the motor 12, the configuration can have the brake function, a power transmission path can be linearly disposed, by placing the brake member 27 between the motor 12 and the circuit board 18.

Next, a characteristic configuration of the motor unit 10 will be described.

As described above, the motor unit 10 of the present embodiment includes the cylindrical outer cylinder 20, and the motor 12, the speed reducer 13, and the inner cylindrical portion 25 are incorporated in the outer cylinder 20. In the inner cylindrical portion 25, the brake member 27 and the circuit board 18 are incorporated in the inner cylinder (pressing member) 26. That is, the motor unit 10 has a double structure in which the inner cylinder 26 is disposed in the outer cylinder 20. An internal gear 50 constituting an outline of the planetary gear train of the speed reducer 13 and the stator 51 of the motor 12 are integrally fixed to an inner surface of the outer cylinder 20.

The brake member 27 and the circuit board 18 are provided in the inner cylinder 26 (pressing member). In the present embodiment, the brake member 27 and the circuit board 18 are entirely inserted into the inner cylinder 26, and the brake member 27 and the circuit board 18 are entirely surrounded and covered by the inner cylinder (pressing member) 26. The inner cylinder 26 is a cylinder with both ends open. As illustrated in FIGS. 4 and 5, three notches 52 are provided at one end of the inner cylinder 26. Each of the notches 52 extends in the axial direction with the end of the inner cylinder 26 as an open end. The notch 52 reaches a region in which the brake member 27 is incorporated.

Figure 6:
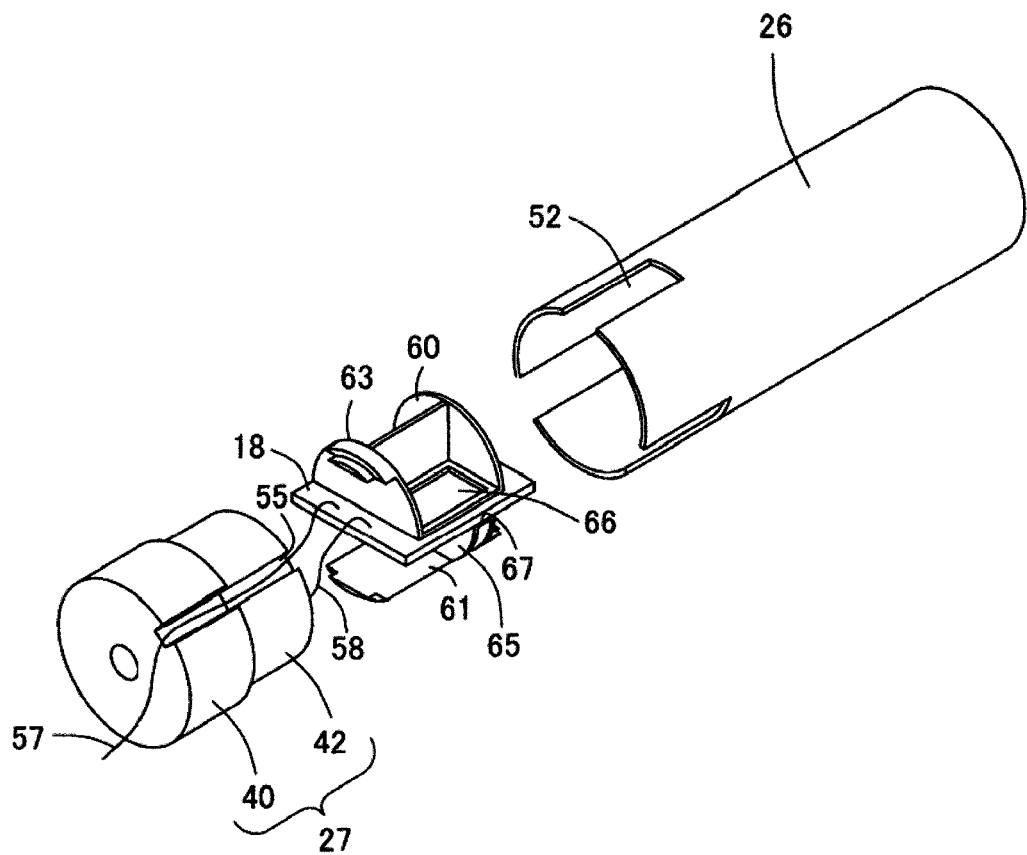
FIG. 6 is an exploded perspective view of an inner cylindrical portion incorporated in the motor unit for the motor incorporating roller (geared motor) in FIG. 4.

As illustrated in FIG. 6, the brake member 27 is provided with a groove 55 extending in the axial direction in an outer portion. The groove 55 extends linearly over both the brake holder 40 and the main body 42. The circuit board 18 is held by a board holder 56. The board holder 56 includes two holder pieces 60 and 61. Both of the two holder pieces 60 and 61 have semicircular inner cylinder inscribed portions 63 and 65 and planar board holding portions 66 and 67. The circuit board 18 is a quadrangular plate, and is sandwiched between the board holding portions 66 and 67 of the two holder pieces 60 and 61.

The inner cylinder 26 is disposed in the outer cylinder 20 with the brake member 27 and the circuit board 18 inserted therein. In the present embodiment, as illustrated in FIG. 4, the outer cylinder 20 has a portion corresponding to the notch 52 of the inner cylinder 26 swaged, and a recess portion 68 of the outer cylinder 20 is engaged with the brake holder 40 of the brake member 27. Therefore, the brake member 27 is integrally fixed to the outer cylinder 20.

In the outer cylinder 20, the motor 12 and the circuit board 18 are connected by wiring 57. As illustrated in FIG. 6, the wiring 57 connecting the motor 12 and the circuit board 18 is accommodated in the groove 55 of the brake member 27. In the outer cylinder 20, the brake member 27 and the circuit board 18 are also connected by wiring 58.

Next, a method for manufacturing the motor unit 10 will be described.

As illustrated in FIG. 7A, in the motor unit 10, the bearing 41 and the speed reducer 13 are mounted in the outer cylinder 20 first. On the other hand, as illustrated in FIG. 7A, the wiring 57 connects between the motor 12 and the circuit board 18 outside the outer cylinder 20. Furthermore, the wiring 58 connects a signal line and a power line between the brake member 27 and the circuit board 18. Here, in the present embodiment, since the brake member 27 is provided between the motor 12 and the circuit board 18, the wiring 57 between the motor 12 and the circuit board 18 needs to straddle the brake member 27. In the present embodiment, the groove 55 extending in the axial direction is provided in the brake holder 40 of the brake member 27, and the wiring 57 between the motor 12 and the circuit board 18 is accommodated in the groove 55 of the brake member 27.

Subsequently, as illustrated in FIG. 7B, the brake member 27 and the circuit board 18 are inserted into the inner cylinder 26. The brake member 27 is disposed in the notch 52 portion of the inner cylinder 26. The motor 12 is outside the inner cylinder 26. Then, as illustrated in FIG. 7C, the motor 12 is pressed against the end portion of the outer cylinder 20. Subsequently, the pressing device 100 pushes the inner cylinder 26 toward the outer cylinder 20. As a result, as illustrated in FIG. 7D, the motor 12 receives the pressing force via the inner cylinder 26 and is press-fitted into the outer cylinder 20. Specifically, the end of the inner cylinder 26 comes into contact with the stator 51 of the motor 12, and the motor 12 is press-fitted into the outer cylinder 20 by pushing the inner cylinder 26 toward the outer cylinder 20. Note that something may be interposed between the inner cylinder 26 and the motor 12.

That is, the inner cylinder 26 is in direct or indirect contact with a pail of the motor 12, and by pressing the inner cylinder 26 in the axial direction, the motor 12 moves integrally with the inner cylinder 26 and is press-fitted into the outer cylinder 20. Note that something may be interposed between the inner cylinder 26 and the motor 12. The inner cylinder 26 is further pushed by the pressing device 100, and the brake member 27 and the circuit board 18 are inserted into the outer cylinder 20 together with the inner cylinder 26 (press-fitting step). As a result, as illustrated in FIG. 7D, the rotation shaft 23 of the motor 12 is engaged with the speed reducer 13 in the outer cylinder 20. The brake member 27 is accommodated in a predetermined position in the outer cylinder 20. Furthermore, the stator 51 of the motor 12 is press-fitted and integrally fixed to the outer cylinder 20.

Subsequently, as illustrated in FIG. 7E, a portion corresponding to the notch 52 portion of the inner cylinder 26 is struck from the outside of the outer cylinder 20 to be recessed and swaged. As a result, as illustrated in FIG. 4B, the recess portion 68 of the outer cylinder 20 reaches the brake member 27 beyond the notch 52 of the inner cylinder 26, and engages with a part of the brake member 27. As a result, the brake member 27 is integrally coupled to the outer cylinder 20. In the present embodiment, three notches 52 are provided in the inner cylinder 26, and the recess portions 68 are provided at positions corresponding to the respective notches 52. However, the number of the notches 52 and the number of the recess portions 68 are arbitrary, and the numbers thereof may be different.

Here, as described above, since the fixed-side shaft 30 is fixed to the conveyor frame and the fixed-side shaft 30 is integrally attached to the outer cylinder 20, the motor unit 10 is not rotatable relative to the conveyor frame. Therefore, the outer cylinder 20 is not rotatable relative to the conveyor frame.

The brake member 27 needs to have a portion that is fixed and does not rotate in order to obtain the reaction force against rotation. In the present embodiment, since the brake member 27 is integrally coupled to the outer cylinder 20 that does not rotate, the reaction force against rotation can be obtained.

In the embodiment described above, the notches 52 are provided in the inner cylinder 26, but openings may be provided instead of the notches.

In the embodiment described above, the Hall sensorless motor is used, but the structure of the motor 12 is not limited, and may be a brushless motor having a Hall sensor, or may be a brush motor. An AC motor may be used.

When the motor incorporating roller 1 is manufactured, a cylinder to be the roller body 2 is separately prepared, and the power transmission member 7 is fixed in the cylinder. Furthermore, the motor unit 10 is inserted into the roller body 2, and the drive-side shaft 31 of the motor unit 10 is engaged with the power transmission member 7.

In the embodiment described above, in the inner cylinder 26, the brake member 27 and the circuit board 18 are entirely inserted into the inner cylinder 26, and the brake member 27 and the circuit board 18 are entirely covered with the inner cylinder 26. However, a part of the brake member 27 and the circuit board 18 may be covered with the inner cylinder 26, and a part thereof may be exposed to the outside.

A part of the motor 12 may be covered with the inner cylinder 26.

In the embodiment described above, the outer cylinder 20 is swaged to directly engage the recess of the outer cylinder 20 with a part of the brake member 27. However, another member such as a pin or a rivet may pass through the outer cylinder 20 to couple the brake member 27 and the outer cylinder 20.

In the embodiment described above, the brake member 27 and the circuit board 18 are inserted into the inner cylinder 26, and the motor 12 is press-fitted into the outer cylinder 20 by pushing the inner cylinder 26 toward the outer cylinder 20 in a state where the motor 12 is pushed against the end of the outer cylinder 20. In the above-described embodiment, the inner cylinder 26 is used as the pressing member.

The pressing member (inner cylinder 26) of the above-described embodiment has a tubular shape, and surrounds the brake member 27 and the circuit board 18 to surround and cover the periphery substantially completely, but the shape of the pressing member is not limited to the tubular shape.

Figure 8A:
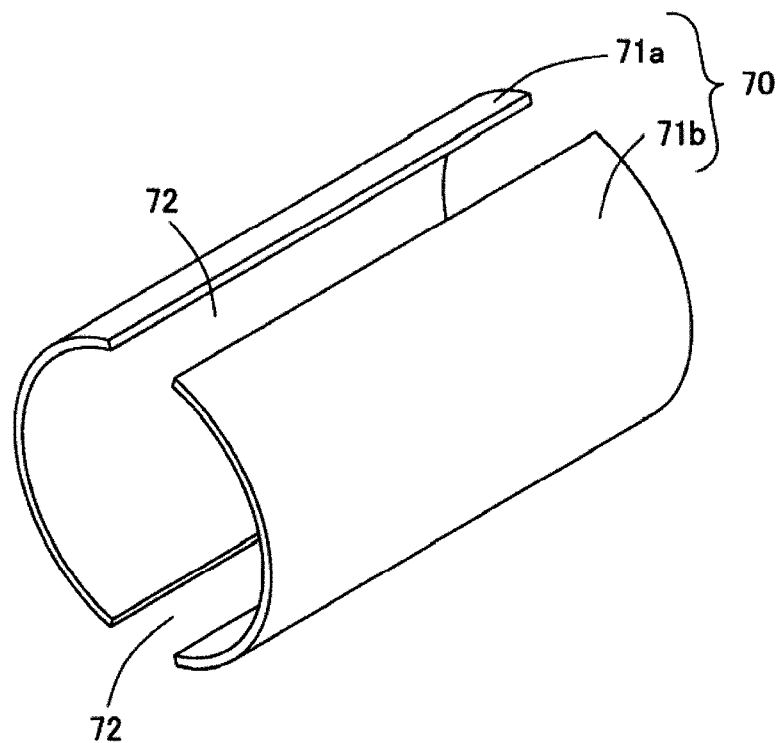
FIGS. 8A and 8B are perspective views illustrating a variant embodiment of a pressing member.
Figure 9:
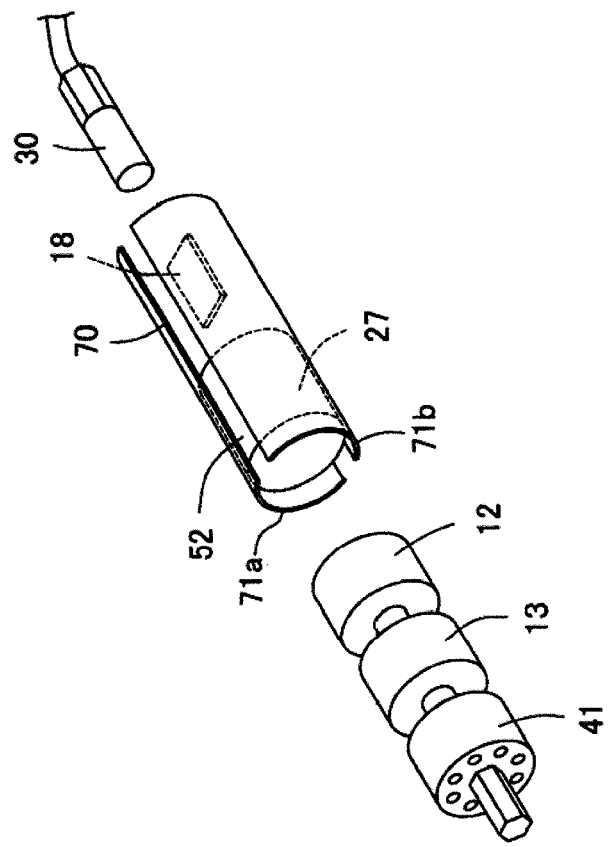
FIG. 9 is an exploded perspective view of a motor unit for a motor incorporating roller (geared motor) according to another embodiment of the present invention.
Figure 9:
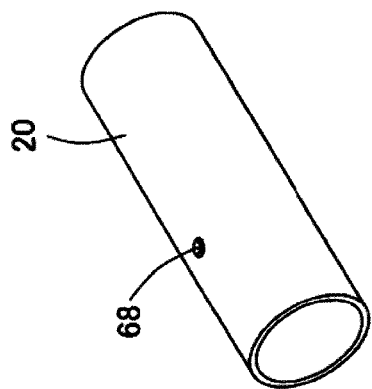

For example, the pressing member may be configured by pressing member pieces 71a and 71b having a half shape like a pressing member 70 illustrated in FIG. 8A. As illustrated in FIG. 9, the pressing member 70 surrounds and covers the periphery of the brake member 27 and the circuit board 18. In the present embodiment, a gap between the pressing member pieces 71a and 71b is an opening 72, a portion corresponding to the opening 72 of the outer cylinder 20 is swaged, and the recess portion 68 of the outer cylinder 20 is engaged with the brake holder 40 of the brake member 27.

Figure 8B:
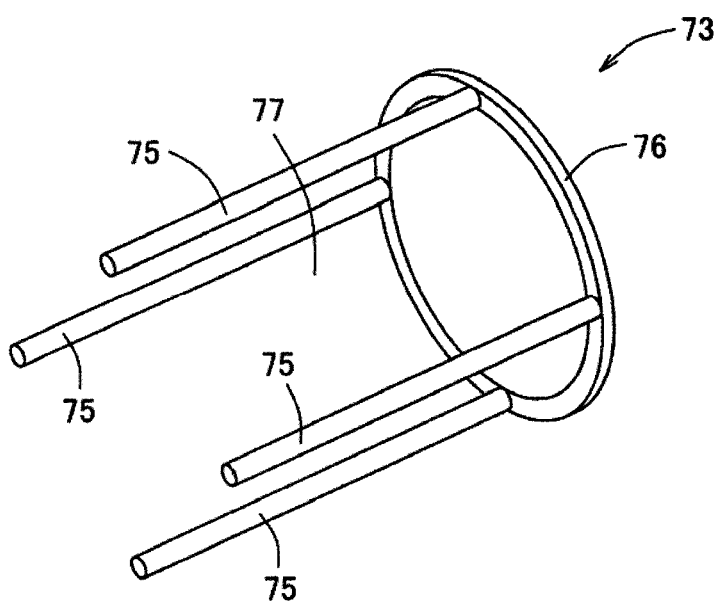

Furthermore, a pin-shaped pressing member 73 as illustrated in FIG. 8B can also be adopted. In the pressing member 73, a plurality of pins 75 protrude from one of an annular link 76. The pressing member 73 surrounds the periphery of the brake member 27 and the circuit board 18. In the present embodiment, a gap between the pins 75 is an opening 77, a portion corresponding to the opening 77 of the outer cylinder 20 is swaged, and the recess portion 68 of the outer cylinder 20 is engaged with the brake holder 40 of the brake member 27. In the press-fitting step described above, the tips of the pins 75 are brought into contact with a part of the motor 12 and the pressing member 73 is pressed in the axial direction, so that the motor 12 moves integrally with the inner cylinder 26 and is press-fitted into the outer cylinder 20.

The motor unit 10 described above has been developed as a constituent member of the motor incorporating roller 1, but can also be used as a geared motor 80. As illustrated in FIG. 4, the geared motor 80 includes the outer cylinder 20, and the motor 12, the speed reducer 13, and the inner cylindrical portion 25 are incorporated in the outer cylinder 20. The inner cylindrical portion 25 includes the inner cylinder (pressing member) 26, and the brake member 27 and the circuit board 18 are incorporated in the inner cylinder 26. In the outer cylinder 20, the brake member 27 is located between the motor 12 and the circuit board 18, and in the outer cylinder 20, the circuit board 18 is connected to the motor 12 and the brake member 27. The motor 12 includes the rotor 53 and the stator 51 that covers the periphery of the rotor, and the stator 51 is fixed to the outer cylinder 20. The inner cylinder (pressing member) 26 is inserted into the outer cylinder 20, and the brake member 27 and the circuit board 18 are covered with the inner cylinder 26. The inner cylinder (pressing member) 26 is in direct or indirect contact with a part of the motor 12, and when the inner cylinder (pressing member) 26 is pressed in the axial direction, the motor 12 moves integrally with the inner cylinder (pressing member) 26.

EXPLANATION OF REFERENCE NUMBERS

1: Motor incorporating roller
2: Roller body
10: Motor unit (motor unit for the motor incorporating roller)
12: Motor
13: Speed reducer
18: Circuit board
20: Outer cylinder
25: Inner cylindrical portion
26: Inner cylinder (pressing member)
27: Brake member
40: Outer portion
51: Stator
52: Notch
53: Rotor
55: Groove
57: Wiring
68: Recess portion
70, 73: Pressing member
72, 77: Opening
80: Geared motor
100: Pressing device

The invention claimed is:

1. A motor unit configured to be inserted into a separately prepared roller body to constitute a motor incorporating roller,
comprising an outer cylinder, a motor, a speed reducer, a brake member, and a circuit board,
wherein each of the motor, the speed reducer, the brake member, and the circuit board is located within the outer cylinder,
wherein the brake member is located between the motor and the circuit board in the outer cylinder,
wherein the circuit board is wired to the motor and the brake member in the outer cylinder, and
wherein the motor unit comprises a cylindrically shaped pressing member inserted into the outer cylinder,
the brake member and the circuit board each being located within the cylindrically shaped pressing member.

2. The motor unit according to claim 1,
wherein the motor includes a rotor and a stator that covers a periphery of the rotor,
the stator being fixed to the outer cylinder.

3. The motor unit according to claim 2,
wherein the cylindrically shaped pressing member is directly or indirectly in contact with a part of the motor, and
wherein the motor moves integrally with the cylindrically shaped pressing member when the cylindrically shaped pressing member is pressed in an axial direction.

4. The motor unit according to claim 2,
wherein the cylindrically shaped pressing member has an opening or a notch, and
wherein at the opening or the notch, the brake member is engaged with the outer cylinder directly or via another member interposed between the brake member and the outer cylinder.

5. The motor unit according to claim 2, wherein the brake member comprises a groove on its side surface, the groove accommodating wiring that connects the motor to the circuit board.

6. A motor incorporating roller, comprising the motor unit according to claim 2, wherein the motor unit is inserted into the roller body.

7. The motor unit according to claim 1, wherein the brake member comprises a groove on its side surface, the groove accommodating wiring that connects the motor to the circuit board.

8. A motor incorporating roller, comprising the motor unit according to claim 1, wherein the motor unit is inserted into the roller body.

9. A geared motor comprising:
an outer cylinder, a motor, a speed reducer, a brake member, and a circuit board, wherein the motor, the speed reducer, the brake member, and the circuit board each is located within the outer cylinder, wherein the brake member is located between the motor and the circuit board in the outer cylinder, wherein the circuit board is wired to the motor and the brake member in the outer cylinder, wherein the motor includes a rotor and a stator that covers periphery of the rotor, the stator being fixed to the outer cylinder, wherein the geared motor comprises a cylindrically shaped pressing member inserted into the outer cylinder, the brake member and the circuit board each being located within the cylindrically shaped pressing member, wherein the cylindrically shaped pressing member is directly or indirectly in contact with a part of the motor, and wherein the motor moves integrally with the cylindrically shaped pressing member when the cylindrically shaped pressing member is pressed in an axial direction.

* * * * *